United States Patent [19]
Edwards et al.

[11] 3,724,517
[45] Apr. 3, 1973

[54] PLANING APPARATUS

[76] Inventors: Raymond S. Edwards, Route 3, P.O. Box 481, Roxboro, N.C. 27573; Thomas L. Guy, Route 6, P.O. Box 188-84, Greensboro, N.C. 27577

[22] Filed: Sept. 8, 1970

[21] Appl. No.: 70,424

[52] U.S. Cl. ............144/116, 143/55 B, 144/242 K, 144/246 A
[51] Int. Cl. .................................................B27c 1/12
[58] Field of Search .......... 144/246 R, 242 C, 242 K, 144/246A, 144/116; 143/55 R, 55 A, 55 B, 56

[56] References Cited

UNITED STATES PATENTS

| 986,782 | 3/1911 | Trogdon | 144/246 A |
| 1,670,360 | 5/1928 | Johnson | 144/246 R |
| 3,275,045 | 9/1966 | Beeley | 144/246 R X |

FOREIGN PATENTS OR APPLICATIONS

| 105,038 | 7/1942 | Sweden | 144/246 A |

*Primary Examiner*—Andrew R. Juhasz
*Assistant Examiner*—James F. Coan
*Attorney*—David Rabin

[57] ABSTRACT

Apparatus having upper and lower rotary cutter heads for planing stock advanced therethrough. The stock is uniformly gripped and advanced by opposed pairs of roller assemblies regardless of irregularities or variations in the thickness of the stock. Each roller assembly pair includes a plurality of axially aligned, pneumatic tires coupled together for rotation by keyed hub members and driven by hydraulic means.

2 Claims, 8 Drawing Figures

INVENTORS
RAYMOND S. EDWARDS
THOMAS L. GUY

INVENTORS
RAYMOND S. EDWARDS
THOMAS L. GUY

INVENTORS
RAYMOND S. EDWARDS
THOMAS L. GUY

PLANING APPARATUS

BRIEF SUMMARY AND OBJECTS OF THE INVENTION

This invention relates generally to woodworking machines and particularly to a planer wherein both surfaces of stock material is planed or cut by cutters.

Briefly, the machine includes a frame having a table supported thereon for supporting stock as it is advanced through the machine by pairs of infeed and outfeed roller assemblies. At least one infeed and outfeed roller assembly is driven by hydraulic or other suitable motor means for advancing the stock to and from cutter means positioned on the frame for engaging both the upper and lower surfaces of the advancing stock material. The cutters preferably are of the rotary type capable of being adjusted to vary the degree of cut into the stock surfaces.

At least one roller assembly of each pair consists of a plurality of wheels having resilient, pneumatic tires axially aligned with respect to a support shaft. Each tire is mounted upon a rim having an opening for receiving the shaft therethrough. The rims of adjacent tires are coupled together for rotation by means of hub members having interlocking lugs and fastener members which extend between hub members mounted on opposite sides of a rim, and through the rim itself. The inner coupled wheels are keyed to the driven shafts at locations outwardly of the end wheels. Alternatively, the wheels may be fastened to hub members having non-round openings therein for rotation with the driven shaft.

Each roller assembly for engaging the upper and lower surfaces of a stock may be positively driven by hydraulic motor means, or only one roller assembly of each pair may be driven.

One of the primary objects of the invention is the provision of a planer having means for accurately controlling and feeding stock material therethrough.

Another object of the invention is the provision of a planer for gripping and feeding stock material by resilient roller assemblies to prevent damaging or marring of the stock.

Still another object of the invention is the provision of a planer having improved stock feeding assemblies which result in higher quality production.

One feature of the invention is the provision of roller assemblies for a planer consisting of a plurality of readily changeable, axially interconnected wheels mounted upon a driven shaft.

Another advantage of the invention is the provision of a feed roller assembly having a series of pneumatic wheels which are sufficiently resilient and yielding to uniformly feed the stock material.

Other features and advantages of the invention will become apparent during the course of the following detailed description.

DETAILED DESCRIPTION OF THE INVENTION

Figure 1:
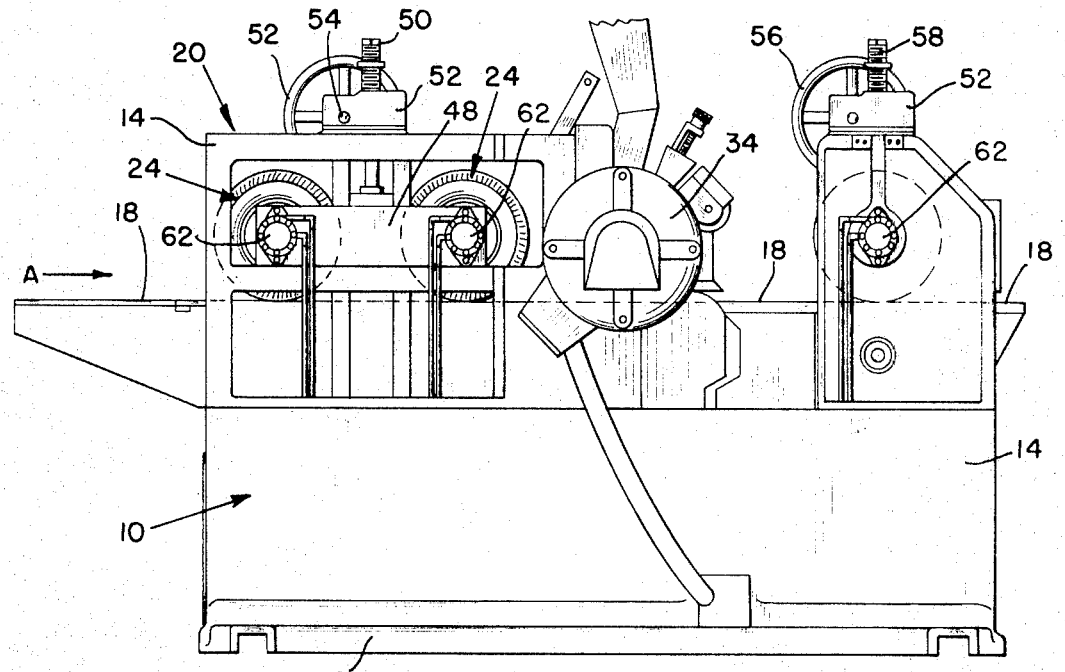
FIG. 1 is a fragmentary, side elevational view of the planer illustrating the infeed and outfeed upper roller assemblies and the hydraulic motor drive means.
Figure 2:
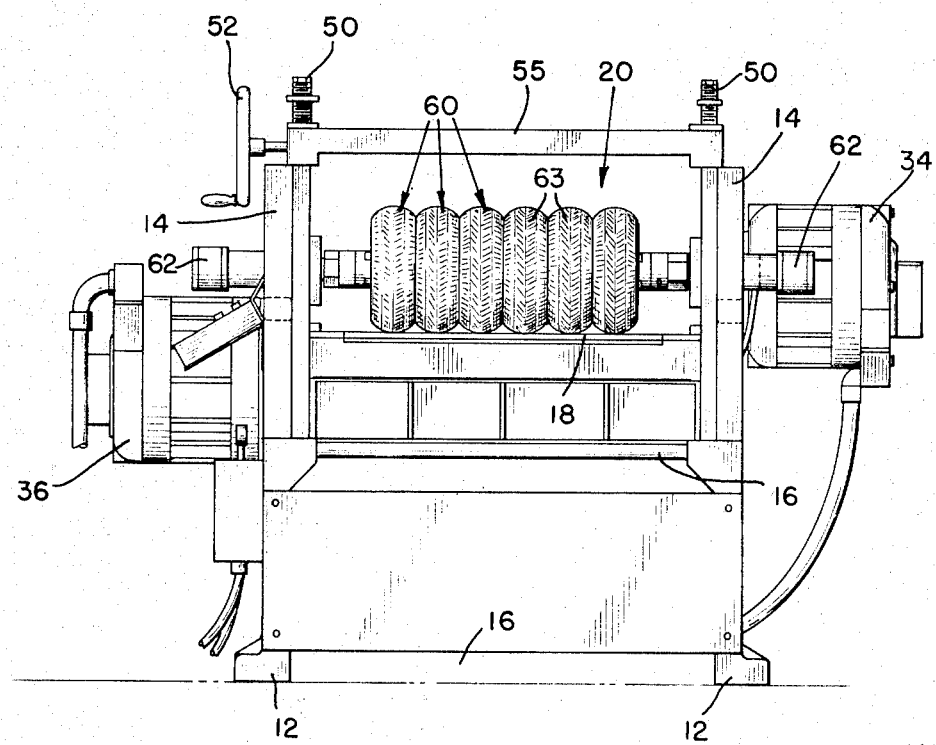
FIG. 2 is a fragmentary rear elevational view of the planer taken from the left hand side of FIG. 1.
Figure 3:
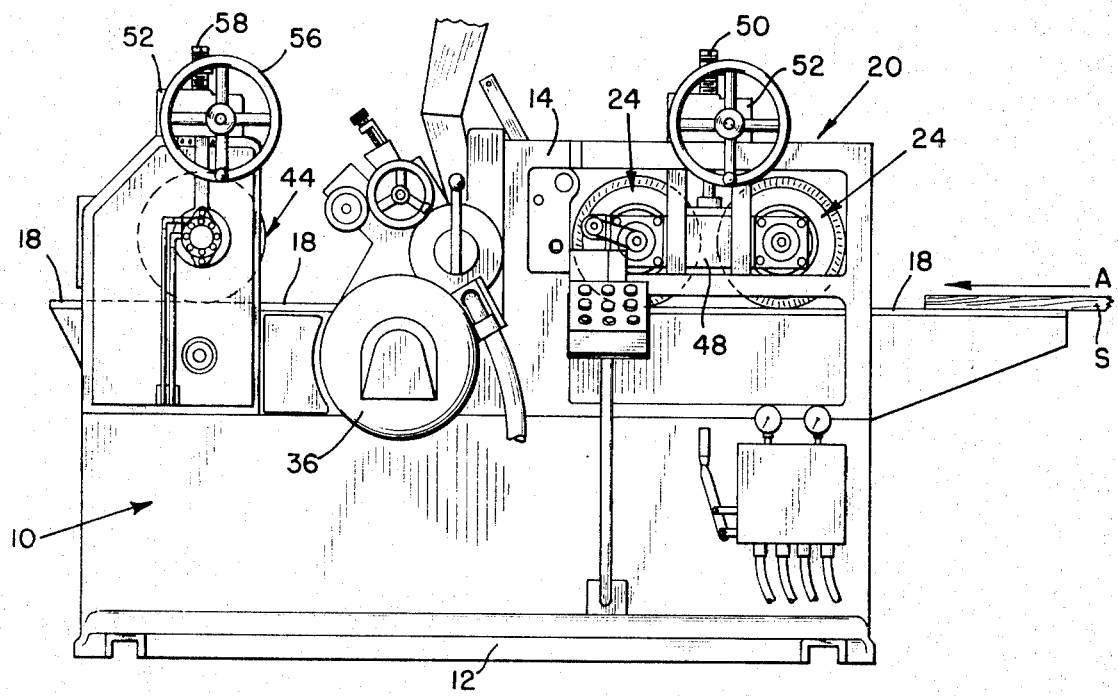
FIG. 3 is a fragmentary side elevational view of the planer taken along the side opposite to that of FIG. 1.

Referring to FIGS. 1–3, the machine has a frame 10 including base members 12 and vertically extending spaced side members 14, the side members 14 being interconnected by cross members 16. Mounted upon the frame 10 by suitable conventional means is a table 18 for supporting and guiding stock material S as it is advanced through the machine. Material is normally fed into the machine in the direction of the arrow A, FIGS. 1 and 3.

Figure 4:
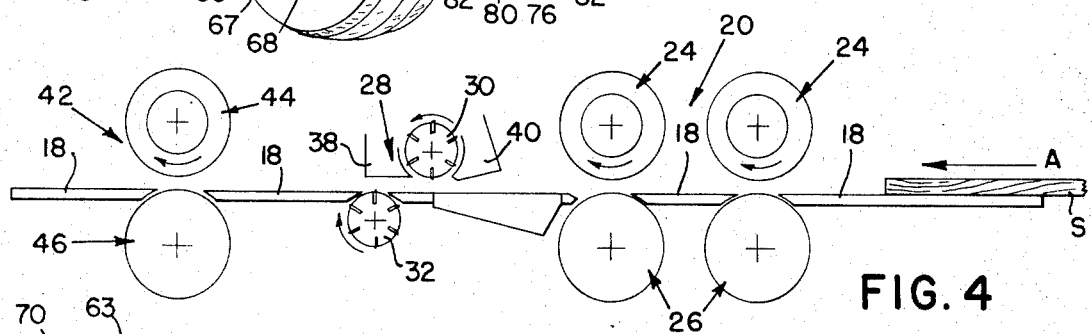
FIG. 4 is a schematic side elevational view of the planer illustrating the opposed upper and lower pairs of infeed and outfeed roller assemblies mounted on opposite sides of the rotary cutter assembly.
Figure 5:
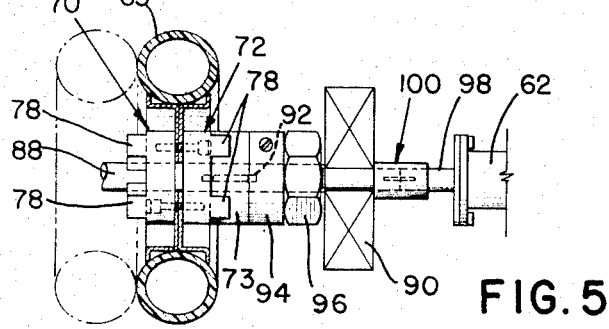
FIG. 5 is an enlarged, fragmentary view of a feed roller assembly illustrating one wheel in section and another wheel in broken line configuration, and further illustrating the manner by which the wheels are secured to the shaft.

An infeed mechanism 20 comprising a plurality of pairs of upper and lower roller assemblies 24 and 26 extends between the frame side members 14, 14 for engaging and feeding the stock S to a cutter assembly 28. While the cutter assembly may be of various forms and may plane both sides or only one side of the stock S, in the preferred embodiment the cutter assembly includes rotary top and bottom cutter heads 30, 32, as shown by FIG. 4, for engaging both sides of the material S. The cutter heads 30 and 32 are driven by conventional electric motors 34, 36. The depth of cut on the stock S may be varied by adjusting the positions of the top and bottom cutter heads with respect to the table 18 in a conventional manner. The top head pressure bar 38 and the tip of the chip breaker 40 are adjusted to a position even with the bottommost knife projections of the top head. The infeed upper roller assemblies 24 have their ends supported by a yoke 48 positioned adjacent each frame side member 14. The yoke 48 and roll assemblies, supported by bearing blocks, are capable of being adjusted vertically by support screws 50 which are actuated through conventional means in response to rotation of hand wheel 52 and shaft 54. A yoke 55 interconnects the support screws 50.

An outfeed mechanism 42 consisting of upper and lower opposed roller assemblies 44, 46 withdraws the material S from the cutter assembly 28. The outfeed upper roller assembly also is vertically adjustable upon rotation of hand wheel 56 and support screw 58 in a manner similar to the infeed roller assemblies 24.

Figure 6:
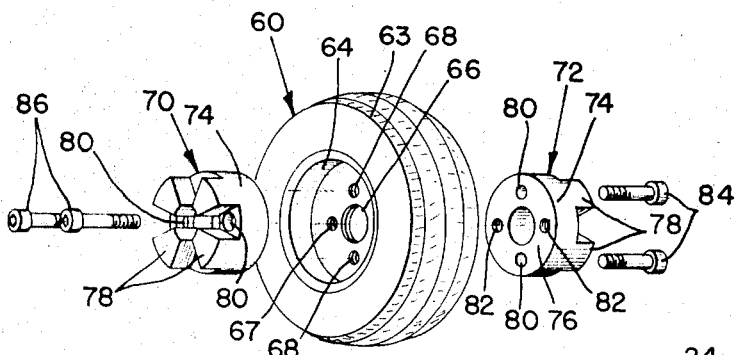
FIG. 6 is an enlarged, perspective view of a wheel illustrating the manner for securing thereto the hubs having axially directed lugs.

The upper infeed and outfeed roller assemblies 24 and 44 are substantially identical, each including a series of axially aligned pneumatic wheels 60 driven by conventional hydraulic motors 62. Each wheel 60 comprises a resilient tire 63 mounted upon the rim 64 and capable of being inflated to the desired degree through a suitable check valve, not shown. The rim is provided with a central annular opening 66 for receiving a shaft therethrough and a plurality of bolt receiving openings 67, 68. Hub members 70, 72 each includes a cylindrical portion 74 and a flat face 76, positioned in abutting relation with rim 64, and axially directed lugs 78. Each hub cylindrical portion 74 is provided with alternating bores 80 and threaded openings 82, as shown by FIG. 6, for receiving bolts 84, 86 therein. Bolts 86, which are spaced 180° apart extend through bores 80 of hub 70 and rim openings 67 and into threaded openings 82 of hub 72. Similarly, bolts 84 extend through bores 80 of hub 72, rim openings 68 and into threaded openings 82 of the hub 70 to form a rigid wheel unit. A plurality of wheel and hub units with lugs 78 in interlocking relation are positioned upon a shaft 88 which is supported at each end upon the frame 10 by bearings 90. The wheels are keyed to the shaft 88 for rotation therewith by means of a hub 73 having lugs thereon which interlock with lugs 78. Hub 73 is secured to shaft 88 by a key 92. A split collar 94 and spacer 96 may be positioned between the bearings 90 and the outermost hub members 73.

The shafts 88 of all upper infeed and outfeed roller assemblies 24, 44 are driven by hydraulic motors 62 located at one or both ends of each shaft. The shafts 88 are secured for rotation with motor shaft 98 by a coupling arrangement 100.

In the embodiment illustrated by FIGS. 1–6, the lower infeed and outfeed roller assemblies 26 and 46 are substantially identical to the upper assemblies with the exception that the lower assembly wheels are idlers rather than being positively driven.

While FIGS. 1–6 illustrate the upper roller assemblies as being driven and the lower assemblies as idlers, it is to be understood that the roller assemblies may be modified, utilizing the principals of the invention. For example, only one of the upper infeed roller assemblies 24 may be positively driven. In addition, rather than having pneumatic wheels, the lower infeed and/or outfeed roller assemblies may have rigid wheel members intercoupled in the same manner as the pneumatic wheels.

Figure 7:
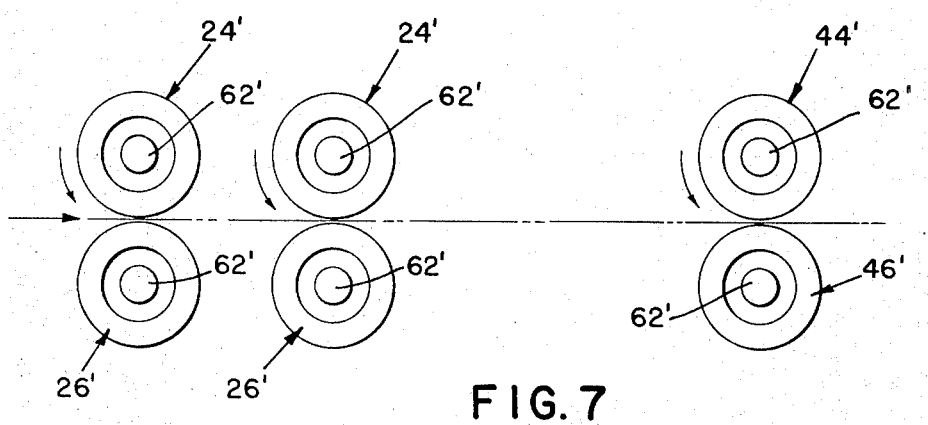
FIG. 7 is a schematic, fragmentary side elevational view of a modified embodiment of the invention wherein all feed roller assemblies are driven.

FIG. 7 illustrates still another embodiment of the invention wherein all roller assemblies are driven. The infeed upper and lower roller assemblies 24', 26', as well as the outfeed upper and lower roller assemblies 44', 46' are driven positively by motors 62'.

Figure 8:
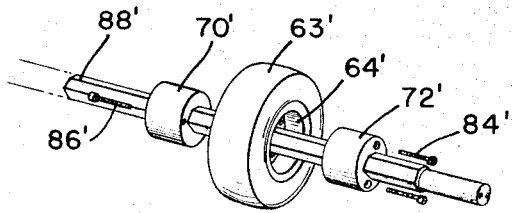
FIG. 8 is a perspective view of a wheel illustrating a modified embodiment of a means for mounting the wheels upon a driven shaft.

FIG. 8 relates to a modified arrangement for securing the wheel units including the tire 63', rim 64' and hubs 70', 72' to a shaft 88' driven by a hydraulic motor. The shaft intermediate portion has a hexagonal outer periphery which extends through an annular opening, not shown in the rim 64'. Hubs 70', 72' have an inner opening with a configuration conforming to the hexagonal shaft 88' thus preventing rotation of the hubs relative to the shaft. Bolts 84', 86' secure the hubs and rim in assembled relation in a manner previously described.

We claim:

1. In a planing machine, a frame, table means mounted upon said frame for supporting and directing stock material advanced through the machine, cutter means positioned in close proximity to said table means for planing material advanced through the machine, a plurality of pairs of opposed roller assemblies frictionally engaging opposite sides of the material, at least one roller assembly of each pair being positively driven, said positively driven roller assemblies including a series of pneumatic tire wheels, maintained in axial alignment upon a shaft, for uniformly gripping the material to obviate marring of the material's surfaces, means for adjustably positioning at least one roller assembly of each pair of roller assemblies relative to the table, fluid motor means coupled to and uniformly driving the wheels of said positively driven roller assemblies, hub members for rotatably securing together said pneumatic tire wheels, each of said hub members having an opening provided therein for receiving a shaft, and a plurality of openings in parallel relation with respect to said shaft receiving opening for receiving fastening means.

2. In a planing machine as defined in claim 1, wherein a hub member is secured to opposite sides of each of said wheels, said opposed hub members between said wheels having axially directed lugs for interlocking adjacent wheels.

* * * * *